United States Patent Office 2,855,370
Patented Oct. 7, 1958

2,855,370

CATALYST

Lester G. Lundsted, Grosse Ile, Mich., assignor to Wyandotte Chemicals Corporation, Wyandotte, Mich., a corporation of Michigan No Drawing. Application June 6, 1956
Serial No. 589,825

2 Claims. (Cl. 252—467)

This application is a continuation-in-part of my parent copending application, Serial No. 256,969, filed November 17, 1951, now abandoned, for "Catalyst," which parent application is a division of my then copending application, Serial No. 36,807, filed July 2, 1948, now U. S. patent, No. 2,601,538, which patent relates to the catalytic isomerization or molecular rearrangement of propylene oxide (preferably 1,2-propylene oxide) to produce, as the major and predominant product, propionaldehyde.

The invention hereof relates to a novel catalyst composition particularly useful in such isomerization processes, as well as to ways of synthesizing such catalyst.

The isomerization of alkylene alpha oxide to aldehydes has constituted a field of study and experimentation by organic chemists for more than the past 40 years. Ipatieff and Leontovitch (Berichte, vol. 36, p. 2016, 1903) first discovered that such isomerization of olefin oxides could be effected by the use of alumina as the catalyst. Then, beginning in 1930 Baur (U. S. Patents 1,906,833 and 2,031,200), Young et al. (U. S. Patent 1,917,179) and Law and McNamee (U. S. Patent 2,159,507) extended the work to include other catalysts. Baur disclosed such catalysts as magnesium pyrophosphate and cerous sulfate from which propionaldehyde was obtained "in good yield" (see Examples 1 and 2 of U. S. 2,031,200); and barium bromide and magnesium oxychloride, from which the propylene oxide conversion product contained a maximum yield of 60% propionaldehyde (see Examples 1 and 2 of U. S. 1,906,833). Law et al. disclosed the use of "alum" type catalysts, such as potassium aluminum sulfate, ammonium aluminum sulfate, potassium chromate and potassium ferric sulfate (U. S. 2,159,507). According to Law et al. (p. 1, col. 1, 11. 25 et seq.) oxy acids, anhydrides and salts of the elements of the fifth and sixth groups of the Period Table, were subject to the disadvantage as catalysts in the isomerization of propylene oxide, in that the condensation or polymerization of propionaldehyde was promoted rather than being retarded.

I have now discovered that the catalytic isomerization of propylene oxide to propionaldehyde can be conducted in the presence of a chromic oxide-tungstic oxide catalyst composition. Such catalyst composition is a complex, the exact identity of which is not yet established, but conforming to the formula $XCr_2O_3 \cdot WO_3$ and for results wherein a high conversion of propylene oxide and a high percentage of propionaldehyde in the conversion products are desired to be obtained, X has a value of more than 4 and less than 75. I have discovered that as high as a 100% conversion of the propylene oxide, and up to 88% of propionaldehyde in the conversion products (herein called "yield") can be obtained by the catalytic isomerization process employing such chromic oxide-tungstic oxide catalyst. This unusually high conversion and high yield of propionaldehyde exceeds the best (cf. "overall yields" and "efficiencies," of examples of U. S. 2,159,507 equivalent to "conversions" and "yields," respectively, of the instant application) that have heretofore been obtainable.

The catalyst of my invention is also of an unexpected nature when it is considered that a chorime oxide gel catalyst alone promotes isomerization of propylene oxide principally to allyl alcohol; propionaldehyde being a minor product. See U. S. patent, No. 2,479,632, which matured from patent application Serial No. 588,710, filed April 16, 1945, by Lester G. Lundsted, Edward J. Schwoegler and Edward C. Jacobs, said Lundsted being applicant herein.

My invention also possesses the additional advantage in that the chromic oxide-tungstic oxide catalyst possesses an unusually high catalyst life, or period of catalytic activity. In other words, such catalyst remains active for a relatively long period of time before requiring regeneration. This is quite unexpected since laboratory work indicated that while tungstic oxide alone promoted the aldehydo isomerism of propylene oxide with an initially high activity, the subsidence of this activity would be too rapid under commercial production conditions to be practical. Moreover, the catalyst of this invention possesses a renewed and high degree of catalytic activity after regeneration, so that the original catalyst mass can be repeatedly used and re-used in the process without the necessity of being discarded.

Still another feature of advantage of this invention is that the chromic oxide-tungstic oxide catalyst can be prepared and obtained in a gel-free or non-gel condition. Thus, the removal by washing away of undesirable reaction products after the formation of the catalyst and the removal of water by evaporation is greatly simplified since there is no gel structure to hold and retain these undesirable reaction products as well as water. Moreover, the problem of obtaining the catalyst at an optimum particle size for a given reaction in which it is to be used is much easier since there is no gel structure to agglomerate the ultimate particles of catalyst during the preparation thereof and to inhibit the size reduction thereof following the drying procedure. The avoidance of gel formation consequently is a significant advance not only from a process point of view but also from a final or use product point of view.

To further illustrate the features of this invention and to enable workers of ordinary skill in the art to duplicate the results of this invention, the following examples are set forth.

PREPARATION OF CATALYST

Example 1

Four hundred grams of chromium trioxide and 100 grams of tungstic acid were ground in a ball mill for two hours until the mass appeared homogeneous. The resulting powder was transferred to a porcelain evaporating dish and heated in an oven at 200 to 220° C. for 24 hours to decompose a portion of the chromium trioxide. At the end of this period the dish containing the mixture was transferred to a muffle furnace and heated to 1000° C. during a period of four hours. Violet fumes, probably a result of the decomposition of the chromium-trioxide, were liberated during this period. The mixture was held at 1000° C. for four hours and then allowed to cool in the furnace to give a bright green, porous, gel-free cake weighing 357.7 grams. This cake was broken up and used directly for catalytic studies. Analysis of the product showed 77.5% $Cr_2O_3$ and 21.3% $WO_3$ corresponding to a mol ratio of 5.5 to 1.

*Example 2*

In this method of preparation of the chromic oxide-tungstic oxide catalyst, a gel-free precipitate was formed by the addition of a solution of sodium tungstate to a solution of chromic nitrate. To 188 grams of chromium nitrate nonahydrate $(Cr(NO_3)_3—9H_2O)$ in 250 ml. of distilled water were added 234 grams of sodium tungstate dihydrate $(Na_2WO_4—2H_2O)$. The pale green, gel-free, precipitate which formed was filtered off and dried in an oven at 110° C. to yield a bright green cake covered by large needles of sodium nitrate. The non-gel solid was crushed and washed with distilled water until tests for nitrate ion with ferric sulfate-sulfuric acid and for sodium with magnesium uranyl acetate were negative. The solid material was removed by filtration and dried at 120° C. to 150° C. in an oven. The finished product, in a non-gel condition and weighing 221.3 grams, analyzed 75.2% tungsten as tungsten trioxide and 14.8% chromium as chromic oxide. Loss on heating at 180° C. was 5.11%. This corresponded to a mol ratio of 0.33 mol $Cr_2O_3$ per mol of $WO_3$.

PROPYLENE OXIDE ISOMERIZATION

Several chromic oxide-tungstic oxide catalyst compositions, made according to the foregoing examples, but in which the $Cr_2O_3$—$WO_3$ ratio was varied, were then placed in a glass tubular heating furnace measuring 25 mm. by 600 mm., wound with electrical resistance heating wire as the heat source and packed with glass wool in the top and bottom of the glass heating furnace. A thermocouple was located in the glass wool section in the top of the tube, which section functioned as the preheater for the propylene oxide fed down through the top of the glass tube furnace. A second thermocouple was located within the interior of the catalyst bed. The temperature of the furnace was automatically controlled. The rate of flow of the propylene oxide through the furnace was measured both in terms of linear feet per second and grams per hour per liter of catalyst. The determination of the flow velocity in terms of linear velocity or "feet per second," instead of space velocity or "grams per hour per liter of catalyst," is preferred in the present process because it has been found by experience to be a more reliable and more readily reproducible method of measurement.

The products were analyzed by an infrared spectograph, this proving to be the most reliable method for correctly determining propionaldehyde in the presence of acetone and other possible products such as allyl alcohol and dimethyl dioxane.

The results obtained on the several catalyst compositions so tested as having varying $Cr_2O_3$—$WO_3$ mol ratios were as stated in the following table. The percentages of "conversion" and "yield" as employed in this table have the following definitions:

Percent conversion =
$$\frac{\text{wt. of propylene oxide consumed}}{\text{wt. of propylene oxide fed}} \times 100$$

Percent yield =
$$\frac{\text{wt. of product}}{\text{wt. of propylene oxide consumed}} \times 100$$

TABLE I

| Catalyst No. | Mol Ratio $Cr_2O_3/WO_3$ | Control Temp., °C. | Max. Bed Temp., °C. | Linear Velocity, ft./sec. | Space Velocity, g./l./hr. | Time on Stream, hrs. | Conversion, Percent | Yield of Propionaldehyde (Percent of Converted Propylene Oxide) |
|---|---|---|---|---|---|---|---|---|
| O-1916B-2 [1] | 0.20/1 | 250 | 300 | .024 | 335 | 38.4 | 73.0 | 69.0 |
| O-1916B-1 [1] | 0.28/1 | 250 | 286 | .025 | 520 | 24.6 | 57.0 | 69.5 |
| O-1885 [1] | 0.82/1 | 250 | 265 | | 384 | 24 | 68.5 | 85.2 |
| O-1989 | 4.2/1 | 300 | 337 | .039 | 300 | 13 | 92.0 | 78.0 |
| O-2209 | 4.7/1 | 215 | 270 | .034 | 198 | 337.3 | 97.2 | 85.7 |
| O-2009 | 5.6/1 | 215 | 300 | .032 | 285 | 5.9 | 100.0 | 88.3 |
| O-2042 | 11.4/1 | 215 | 315 | .036 | 320 | 5 | 98.5 | 84.2 |
| O-2045 | 23.0/1 | 215 | 312 | .037 | 328 | 6 | 99.5 | 85.0 |
| O-2057 | 35.7/1 | 215 | 270 | .034 | 312 | 6 | 98.5 | 81.8 |
| O-2077 | 73.0/1 | 215 | 272 | .034 | 305 | 6 | 100.0 | 80.0 |
| O-2177 | 188/1 | 215 | 314 | .037 | 327 | 9.5 | 93.0 | 72.4 |

[1] Catalyst made by method of Example 2, all others by method of Example 1.

The results of the foregoing table thus confirm that, for the aldehydo-isomerization of propylene oxide, the preferred range of $Cr_2O_3/WO_3$ mol ratio in the catalyst composition is greater than 4 to 1 and less than 75 to 1. Beyond the upper and lower limits of this range, it will be seen that there is a material depreciation in either the conversion percentage, or the proportion of propionaldehyde in the converted products. In this optimum $$Cr_2O_3/WO_3$$

mol ratio range, the percentage conversion is practically 100% (i. e. 97.2–100%) and the percentage of propionaldehyde in the converted products is 80.0–88.3%.

Preferred operating conditions were established as in the ranges of 0.02–0.07 foot per second linear velocity of propylene oxide and a furnace control temperature of 200–300° C.

CATALYST LIFE TESTS

Two catalyst compositions, prepared according to Example 1 and having the $Cr_2O_3/WO_3$ mol ratios of 35.5/1 and 4.7/1 respectively, were placed in a stainless steel heating furnace having an interior catalyst-containing chamber measuring 1" by 43". This heating chamber was enclosed in a fluid-type jacket containing "Dowtherm" fluid. The heat source was provided by two parallel electric heating elements wound around the outer jacket and having a capacity of 15 amperes at 110 volts. Suitable thermocouples and thermostatically controlled rheostats were provided for maintaining and measuring furnace temperature and the catalyst bed temperature. The catalyst was placed in the interior of the stainless steel heating furnace tube, forming a catalyst bed of 12" depth.

Each one of the 35.5/1 and 4.7/1 $Cr_2O_3/WO_3$ mol ratio catalyst compositions was subjected to operating cycles totalling 652.5 and 563.2 hours of operation respectively. At the end of each operating cycle (the minimum cycle being 109.8 hours), the catalyst was regenerated by heating in an air stream until analysis of exhaust gases showed the same percentage of oxygen as the feed gases. This was taken as an indication that carbon and resinous deposits had been burned off and the catalyst was ready for re-use.

The results taken from the second and fourth cycles of such catalyst life study tests are tabulated as follows:

|  | Catalyst No. 0-2183 (35.5/1 $Cr_2O_3/WO_3$) | | Catalyst No. 0-2209 (4.7/1 $Cr_2O_3/WO_3$) | |
| --- | --- | --- | --- | --- |
| Cycle Number | 2 | 4 | 2 | 4 |
| Average space velocity, g./l./hr | 212 | 191 | 198 | 207 |
| Average linear velocity, ft./sec | 0.0365 | 0.033 | 0.034 | 0.038 |
| Propylene oxide feed, g | 3,602 | 3,106.5 | 4,499 | 2,504 |
| Products recovered, g | 3,527 | 3,022 | 4,393 | 2,454 |
| Total Conversion to, g.: | | | | |
| Propionaldehyde | 3,002 | 2,482 | 3,746 | 2,082 |
| Acetone | 74 | 58.7 | 64.0 | 38.2 |
| Allyl Alcohol | 311.6 | 292.3 | 274 | 179.8 |
| Unidentified | 112.5 | 191.1 | 190 | 146.2 |
| Percent Conversion | 99.4 | 100 | 97.5 | 99.5 |
| Percent Yield: | | | | |
| Propionaldehyde | 83.8 | 80.3 | 85.7 | 81.2 |
| Acetone | 2.1 | 1.2 | 1.4 | 1.6 |
| Allyl Alcohol | 8.7 | 9.2 | 6.2 | 7.3 |
| Unidentified | 3.3 | 5.8 | 4.2 | 6.0 |
| Loss | 2.1 | 2.8 | 2.5 | 3.9 |
| Average production/24 hrs., g./l. of catalyst: | | | | |
| Propionaldehyde | 4,180 | 3,140 | 3,960 | 4,181 |
| Acetone | 103 | 81.2 | 67.7 | 77 |
| Allyl Alcohol | 430 | 404 | 290 | 362 |
| Unidentified (principally dimethyl dioxane) | 156 | 266 | 201 | 294 |

From the foregoing table, it will be seen that even at the end of the fourth cycle or run in each case, that the conversion percentage remained at its maximum and the yield of propionaldehyde was still over 80%.

What is claimed is:

1. A process for preparing a non-gel complex catalyst conforming to the chemical formula $XCr_2O_3 \cdot WO_3$ wherein X has a value lying within a range from 0.20 to 188, which comprises contacting a chromium nitrate with a sodium tungstate in aqueous solution, the mol ratio of said chromium nitrate to said sodium tungstate being sufficient to give X, whereby $XCr_2O_3 \cdot WO_3$ is precipitated in a gel-free condition and sodium nitrate is formed; washing the gel-free precipitate free of sodium nitrate; and then subjecting the precipitate to filtration followed by heat drying.

2. A process for preparing a non-gel complex catalyst conforming to the chemical formula $XCr_2O_3 \cdot WO_3$ wherein X has a value lying within a range from 0.20 to 188, which comprises heating an intimate, physical mixture of finely divided, solid chromic oxide and tungstic oxide to a temperature of 1,000° C. until violet-colored fumes are evolved, the mol ratio of chromic oxide to tungstic oxide in said mixture being sufficient to give X.

References Cited in the file of this patent

UNITED STATES PATENTS

| 2,320,253 | Arnold | May 25, 1943 |
| 2,503,050 | Jacobs et al. | Apr. 4, 1950 |
| 2,600,655 | Jacobs et al. | June 17, 1952 |
| 2,601,538 | Lanstead | June 24, 1952 |